United States Patent [19]

Elser et al.

[11] 4,048,199
[45] Sept. 13, 1977

[54] PRODUCTION OF AMINONITRODIHYDROXYANTHRAQUINONES BY PARTIAL REDUCTION DINITRODIHYDROXYANTHRAQUINONES

[75] Inventors: Wolfgang Elser, Wachenheim; Gerhard Epple, Ludwigshafen, both of Germany

[73] Assignee: BASF Aktiengesellschaft, Ludwigshafen (Rhine), Germany

[21] Appl. No.: 718,856

[22] Filed: Aug. 30, 1976

Related U.S. Application Data

[63] Continuation of Ser. No. 543,246, Jan. 23, 1975, abandoned.

[30] Foreign Application Priority Data

Feb. 7, 1974 Germany ............................ 2405812

[51] Int. Cl.$^2$ ........................ C07C 49/68; C09B 1/22
[52] U.S. Cl. .................................................. 260/380
[58] Field of Search ...................... 260/378, 380, 700

[56] References Cited

U.S. PATENT DOCUMENTS

| | | | |
|---|---|---|---|
| 2,185,709 | 1/1940 | Ogilvie et al. | 260/378 |
| 2,273,966 | 2/1942 | Klein | 260/378 |
| 2,480,269 | 8/1949 | Seymour et al. | 260/380 X |
| 2,485,197 | 10/1949 | Grossmann | 260/380 |
| 2,819,275 | 1/1958 | Grossmann et al. | 260/380 |

FOREIGN PATENT DOCUMENTS

| | | | |
|---|---|---|---|
| 38-8847 | 1/1962 | Japan | |
| 44-21432 | 9/1969 | Japan | |
| 322,576 | 12/1929 | United Kingdom | 260/378 |
| 700,044 | 11/1953 | United Kingdom | 260/378 |
| 757,752 | 9/1956 | United Kingdom | 260/689 |

*Primary Examiner*—Allen B. Curtis
*Attorney, Agent, or Firm*—Johnston, Keil, Thompson & Shurtleff

[57] ABSTRACT

The production of aminonitrodihydroxyanthraquinones of the formula:

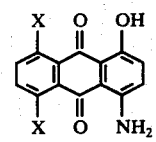

in which one X is OH and the other X is $NO_2$ by partial reduction of the corresponding dinitrodihydroxyanthraquinone or mixtures thereof by heating at 80°–250° C in the presence of ½ to 5 times the weight thereof of an unsubstituted or substituted phenol. The reduction is accelerated by being carried out in the presence of a small amount such as 0.5–20 mol percent of an alkaline-reacting agent. Pure aminonitrohydroxyanthraquinones are obtained which are free from diaminodihydroxyanthraquinones.

17 Claims, No Drawings

PRODUCTION OF AMINONITRODIHYDROXYANTHRAQUINONES BY PARTIAL REDUCTION DINITRODIHYDROXYANTHRAQUINONES

This is a continuation, of application Ser. No. 543,246 filed Jan. 23, 1975, now abandoned.

The invention relates to a process for the production of aminonitrodihydroxyanthraquinones.

It is known from Swiss Pat. No. 370,857 that dinitrodihydroxyanthraquinones can be selectively reduced with sodium hydrogen sulfide or sugars having a reducing action in an alkaline medium to give aminonitrodihydroxyanthraquinones. According to the disclosure in Japanese Patent Applications Nos. 8847/1963 and 21432/1969 the partial reduction can also be carried out with glucose in aqueous diethanolamine solution.

We have found that an aminonitrodihydroxyanthraquinone of the formula (I):

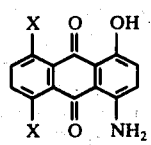

(I)

in which one X is hydroxyl and the other X is nitro can be obtained in good yields and high purity by partial reduction of a dinitrodihydroxyanthraquinone by heating the dinitro compound in the presence of a phenol.

The aminonitrodihydroxyanthraquinones obtained are free from diaminodihydroxyanthraquinones. The compounds (I) are important intermediates for the production of valuable disperse dyes.

The phenol serves as a reducing agent in the process according to the invention. Phenol having no other substituents is preferred as the reducing agent; other phenols which may be used include those bearing alkyl of 1 to 4 carbon atoms, halogen, alkoxy of 1 to 4 carbon atoms and/or amino as substituents in the phenyl nucleus and phenols which have a higher basicity than unsubstituted phenol. Specific examples (in addition to phenol itself) are o-cresol, m-cresol, p-cresol, the xylenols, p-aminophenol, o-aminophenol, m-aminophenol, p-tert.-butylphenol, pyrogallol, resorcinol, hydroquinone, hydroquinone monomethyl ether and mixtures of the same.

For economical and technical reasons phenol and the cresols are particularly preferred as reducing agents.

The process according to the invention is either carried out in a large excess of the phenol serving as reducing agent and which thus serves at the same time as a solvent or in a solvent which is inert under the reaction conditions in the presence of a phenol.

When the reduction is carried out in a phenol or mixture of phenols as solvent the amount of phenol is chosen so that the reaction mixture remains capable of being stirred before, during and after the reduction. As a rule the weight of phenol used is from 1.5 to 8 times that of the dinitrodihydroxyanthraquinone. No advantage is obtained by using a larger amount of phenol but there is the disadvantage that larger amounts of phenol have to be dealt with in the processing after the end of the reaction. For the sake of economy the amount of phenol used is preferably from 2.2 to 5 times that of the dinitro compound.

When the partial reduction is carried out in a solvent suitable solvents are those which are inert under the reaction conditions or do not react in an undesirable way with the reactants and which have a boiling point which is higher than the desired reaction temperature. Examples of these are ethylene glycol, diethylene glycol, diethylene glycol monomethyl ether and monoethyl ether, N-methylpyrrolidone, N,N-dimethylformamide, o-dichlorobenzene, trichlorobenzene, nitrobenzene, naphthalene, the methylnaphthalenes and mixtures of the same.

The amount of solvent used is as a rule from twice to ten times that of the dinitrodihydroxyanthraquinone.

When the reduction is carried out in a solvent the amount of phenol used as reducing agent may be from half to five times and preferably from 0.8 to three times the weight of the dinitrodihydroxyanthraquinone.

The reaction temperature depends mainly on the phenol used as reducing agent. The reduction is normally carried out at a temperature of from 80° to 250° C and preferably at from 100° to 180° C. When for example phenol is used as both solvent and reducing agent it is preferred to use the boiling temperature. The partial reduction is generally over after eight to eighteen hours under these conditions.

The partial reduction can be accelerated by adding an alkaline agent. Examples of alkaline agents are: the alkali metal and alkaline earth metal hydroxides such as sodium hydroxide, potassium hydroxide, calcium hydroxide, barium hydroxide; the alkali metal carbonates and hydrogen carbonates such as potassium carbonate, sodium carbonate, potassium hydrogen carbonate, sodium hydrogen carbonate; alkali metal acetates such as sodium acetate and potassium acetate; alkali metal and alkaline earth metal phenolates such as potassium phenolate, sodium phenolate and calcium phenolate; aromatic nitrogen bases such as pyridine, the picolines, quinaldine and quinoline; secondary and tertiary aliphatic and cycloaliphatic amines such as tributylamine, dibutylamine, triethylamine, dicyclohexylamine and N-methylcyclohexylamine; dialkylanilines such as N,N-dimethylaniline; and saturated heterocyclic five-membered and six-membered heterocyclic bases such as piperidine, piperazine, morpholine, hexamethylenimine and thiomorpholine and mixtures of the same. For the sake of economy sodium carbonate, potassium carbonate, sodium hydrogen carbonate, sodium acetate, potassium hydrogen carbonate, pyridine, piperidine, quinoline, morpholine and/or tributylamine are used in particular.

There is a clear acceleration of the reduction by adding only 0.5 mole% of alkaline agent, based on the dinitrodihydroxyanthraquinone. As a rule the amount of alkaline agent or mixture thereof used is from about 0.5 to 20mole% and preferably from 3 to 10 mole%. There is no advantage in using a larger amount of the alkaline agent but rather the disadvantage that secondary reactions take place to an undesirable extent.

When the alkaline-reacting agents which have a catalytic effect on the partial reduction are used, the reaction temperature is generally within the abovementioned temperature range. In many cases however it is possible depending on the reducing agent and alkaline agent used to carry out the reduction at a lower temperature than in the absence of an alkaline agent or at the same temperature within a shorter time. It is preferable to carry out the partial reduction at a temperature of from 100° to 180° C.

Thus for example in the partial reduction of a mixture of 1,5-dinitro-4,8-dihydroxyanthraquinone and 1,8-dinitro-4,5-dihydroxyanthraquinone in the presence of potassium carbonate as the alkaline agent and phenol as the reducing agent and solvent the best results are obtained at a temperature of from 110° to 160° C.

In the presence of the alkaline agent the reaction is generally over after from one hour to twelve hours.

The reaction may be monitored by means of thin layer chromatograms and the end of the reduction thus determined.

The reduction mixture is generally processed by adding a diluent such as a low boiling point alcohol or a mixture of low boiling point alcohols with water which is miscible with the solvent used in the reduction and which has little or no solubility for the reduction product. Examples of low boiling point alcohols are ethanol, isopropanol, n-propanol, n-butanol, isobutanol and preferably methanol.

The reduction product is precipitated upon dilution and can be isolated from the mixture by filtration. The filter residue is washed first with the diluent and then with water and if desired dried.

The following Examples will further illustrate the process according to the invention. The parts and percentages hereinafter given are by weight. Parts by volume bear the same relation to parts by weight as the liter to the kilogram.

EXAMPLE 1

16.5 parts of a mixture of 1,5-dinitro-4,8-dihydroxyanthraquinone and 1,8-dinitro-4,5-dihydroxyanthraquinone (about 1:1 parts) is heated with 50 parts of phenol for eight hours at 180° C while stirring. After cooling 100 parts by volume of methanol is added, the precipitate is suction filtered and the residue is washed with methanol and then with hot water. After drying 13 parts of a mixture of 1-amino-5-nitro-4,8-dihydroxyanthraquinone and 1-amino-8-nitro-4,5-dihydroxyanthraquinone is obtained; this is equivalent to 87% of the calculated yield.

EXAMPLE 2

50 parts of phenol, 0.7 part of dry potassium carbonate and 16.5 parts of 1,5(1,8)-dinitro-4,8(4,5)-dihydroxyanthraquinone (1:1 part) mixture is heated for nine hours at 130° C. The reaction mixture is processed as described in Example 1. 10 parts of aminonitrodihydroxyanthraquinone is obtained.

EXAMPLE 3

16.5 parts of 1,5(1,7)-dinitro-4,8(4,5)-dihydroxyanthraquinone (0.8:1 part) is heated at 130° C with 50 parts of phenol and 4.1 parts of anhydrous sodium acetate for fourteen hours. After processing as described in Example 1 8 parts of aminonitrodihydroxyanthraquinone is obtained.

EXAMPLE 4

16.5 parts of a mixture of 1,5(1,8)-dinitro-4,8(4,5)-dihydroxyanthraquinone (1:0.9 part) is added to a mixture of 50 parts of phenol and 0.6 part of anhydrous sodium carbonate at 70° C while stirring. The mixture is heated for 3.5 hours at 150° C and allowed to cool. 200 parts by volume of methanol is added and the precipitate is filtered off. The filter cake is washed with methanol, then with 0.5% sodium carbonate solution at from 50° to 60° C and finally with hot water. After drying 10 parts of aminonitrodihydroxyanthraquinone is obtained.

EXAMPLE 5

A mixture of 50 parts of phenol, 16.5 parts of 1,5(1,8)-dinitro-4,8(4,5)-dihydroxyanthraquinone (1:1 part) mixture and 1 part of tributylamine is heated for eleven hours while stirring at 130° C and for 3.5 hours at 150° C. After cooling, 50 parts by volume of methanol is added. The precipitated reaction product is suction filtered, washed with 50 parts by volume of methanol and then with hot water and dried. 9 parts of aminonitrodihydroxyanthraquinone is obtained.

EXAMPLE 6

The procedure described in Example 4 is repeated but 0.5 part of sodium hydrogen carbonate is used instead of 0.6 part of anhydrous sodium carbonate. 10 parts of aminonitrodihydroxyanthraquinone is obtained.

EXAMPLE 7

The procedure described in Example 2 is repeated but only 0.35 parts of potassium carbonate is used. After processing an aminonitrodihydroxyanthraquinone is obtained which corresponds to that obtained according to Example 2.

EXAMPLE 8

16.5 parts of 1,5(1,8)-dinitro-4,8(4,5-dihydroxyanthraquinone mixture (1:0.9 part) is added while stirring to a mixture of 50 parts of p-cresol and 0.7 part of anhydrous potassium carbonate. The reaction mixture is heated for 4.5 hours at 125° to 130° C. The product is processed as described in Example 1. 12 parts (equivalent to 80% of the calculated yield) of aminonitrodihydroxyanthraquinone is obtained.

EXAMPLE 9

16.5 parts of 1,5(1,8)-dinitro-4,8(4,5)-dihydroxyanthraquinone mixture (1:1 part) is heated in 50 parts of p-cresol for 1 hour at 145° to 150° C and for 1 hour at 185° to 190° C. After processing as described in Example 1 9 parts of aminonitrodihydroxyanthraquinone is obtained.

EXAMPLE 10

16.5 parts of 1,5(1,8)-dinitro-4,8(4,5)-dihydroxyanthraquinone mixture (1:0.8 part) is introduced into 50 parts of o-cresol and the whole is heated while stirring for 5.5 hours at 165° to 170° C. The reaction mixture is cooled and processed as described in Example 4. 10.5 parts of aminonitrodihydroxyanthraquinone is obtained.

EXAMPLE 11

9.7 parts of p-aminophenol and 16.5 parts of 1,5(1,8)-dinitro-4,8(4,5)-dihydroxyanthraquinone mixture (1:0.9 part) are heated in 50 parts by volume of o-dichlorobenzene while stirring for 4.5 hours at 125° to 130° C. After standing overnight 2.5 parts of p-aminophenol is added and the reaction mixture is stirred again for 3.5 hours at 130° C. After cooling 200 parts by volume of methanol is added and the precipitated dye is filtered off. After the reaction product has been washed with methanol and hot water it is dried. 13 parts of a dye is obtained which consists predominantly of aminonitrodihydroxyanthraquinone.

EXAMPLE 12

33 parts of 1,5(1,8)-dinitro-4,8(4,5)-dihydroxyanthraquinone (1:1 part) and 24 parts of p-aminophenol are heated in 100 parts by volume of nitrobenzene for 3.5 hours at 150° C and for 1.5 hours at 170° C while stirring. After cooling the reaction product is precipitated with methanol, filtered off, washed with methanol and hot water and dried. 21 parts of aminonitrodihydroxyanthraquinone is obtained.

EXAMPLE 13

16.5 parts of 1,5(1,8)-dinitro-4,8(4,5)-dihydroxyanthraquinone (1:0.9 part) and 12.4 parts of hydroquinone monomethyl ether are heated in 100 parts by volume of methyl diglycol for 10 hours at 190° C while stirring. After the reaction mixture has cooled it is poured into 500 parts by volume of 0.5% sodium carbonate solution and the reaction product is suction filtered, washed with water and dried. 11 parts of aminonitrodihydroxyanthraquinone is obtained.

EXAMPLE 14

The procedure described in Example 13 is repeated but 11 parts of hydroquinone is used instead of 12.4 parts of hydroquinone monomethyl ether. 13 parts of aminonitrodihydroxyanthraquinone is obtained.

EXAMPLE 15

16.5 parts of 1,5-dinitro-4,8-dihydroxyanthraquinone is added to a mixture of 50 parts of phenol and 0.35 part of anhydrous potassium carbonate which has been heated to 70° C. The mixture is heated at 130° C for thirteen hours while stirring. After processing as described in Example 4 8 parts of 1-amino-5-nitro-4,8-dihydroxyanthraquinone is obtained.

EXAMPLE 16

16.5 parts of 1,5(1,8)-dinitro-4,8(4,5)-dihydroxyanthraquinone mixture (1:1 part) and 1 part of piperidine are heated in 50 parts of phenol for 18 hours at 145° to 150° C. After the reaction mixture has been cooled to 60° C 180 parts of methanol and 20 parts of water are added. The precipitated dye is filtered off, washed with methanol and water and dried. 15 parts of a dye is obtained which consists predominantly of aminonitrodihydroxyanthraquinone.

EXAMPLE 17

The procedure described in Example 16 is repeated but 1 part of pyridine is used instead of 1 part of piperidine. 15 parts of aminonitrodihydroxyanthraquinone is obtained.

EXAMPLE 18

8.25 parts of 1,8-dihydroxy-4,5-dinitroanthraquinone is heated in 40 parts of phenol in the presence of 1 part of morpholine for 3 hours at 140° to 150° C. Then another 1 part of morpholine is added and the whole is heated for 1 hour at 150° C. The reaction mixture is allowed to cool to 60° C, 80 parts of methanol is added and the precipitated reaction product is suction filtered. The filter residue is washed with hot water and dried. 4.9 parts of 1-amino-8-nitro-4,5-dihydroxyanthraquinone is obtained.

EXAMPLE 19

The procedure of Example 18 is repeated but using 1 part of N,N-dimethylaniline instead of 1 part of morpholine. The yield of 1-amino-8-nitro-4,5-dihydroxyanthraquinone is 5.7 parts, equivalent to 76% of the calculated yield.

EXAMPLE 20

The procedure of Example 18 is repeated but 1 part of quinoline is used instead of 1 part of morpholine. The reaction is over after nine hours. After processing 6.0 parts of 1-amino-8-nitro-4,5-dihydroxyanthraquinone is obtained.

EXAMPLE 21

40 parts of resorcinol is heated to 150° C and 8.25 parts of 1,8-dinitro-4,5-dihydroxyanthraquinone is added. The reaction mixture is stirred for 1.5 hours at 150° C, cooled to 60° C and 120 parts of methanol is added. The reduction product is thus precipitated. The precipitate is suction filtered and washed with methanol and hot water. The yield of 1-amino-8-nitro-4,5-dihydroxyanthraquinone after drying is 5.9 parts, i.e. 78.6% of the calculated yield.

EXAMPLE 22

50 parts of o-dichlorobenzene, 8.25 parts of 1,8-dinitro-4,5-dihydroxyanthraquinone and 3.5 parts of pyrogallol are heated for 3 hours at 150° C while stirring. Then 3.5 parts of pyrogallol is introduced and the reaction mixture is heated for another 7 hours at 150° C. After the reaction mixture has been cooled to 60° C it is diluted with 120 parts of methanol and cooled to ambient temperature. The precipitated reduction product is suction filtered, washed with methanol and hot water and dried. 5.3 parts of 1-amino-8-nitro-4,5-dihydroxyanthraquinone is obtained.

We claim:

1. A process for the production of an aminonitrodihydroxyanthraquinone of the formula:

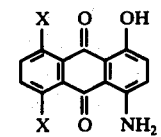

in which one X is hydroxyl and the other X is nitro, by partial reduction, which comprises heating a reaction mixture consisting essentially of 1,5-dinitro-4,8-dihydroxyanthraquinone, 1,8-dinitro-4,5-dihydroxyanthraquinone or a mixture thereof and a reductant selected from the group consisting of unsubstituted phenol, pyrogallol, resorcinol, hydroquinone, hydroquinone monomethyl ether, substituted phenol having on the phenyl nucleus besides the phenolic -OH one or more substituents selected from the group consisting of alkyl having 1-4 carbon atoms, alkoxy having 1-4 carbon atoms, halogen and amino and mixtures thereof, at from 80° to 250° C until one of the two nitro groups of each respective 1,5-dinitro-4,8-dihydroxyanthraquinone and 1,8-dinitro-4,5-dihydroxyanthraquinone is reduced to the amino group and the reduction product of the above formula is then separated.

2. A process as claimed in claim 1 wherein the reduction is carried out at a temperature of from 100° to 180° C.

3. A process as claimed in claim 1 wherein the reduction is carried out in an excess of said reductant as the reaction medium.

4. A process as claimed in claim 1 wherein the amount of said reductant is from half to five times the weight of the dinitrodihydroxyanthraquinone.

5. A process as claimed in claim 1 wherein the reduction is carried out in the presence of 0.5 to 20 mol percent of an alkaline agent selected from the group consisting of an alkali metal hydroxide, an alkaline earth metal hydroxide, an alkali metal carbonate, an alkali metal hydrogen carbonate, an alkali metal acetate, an alkali metal phenolate, an alkaline earth metal phenolate, pyridine, a picoline, quinaldine, quinoline, a secondary or tertiary aliphatic or cycloaliphatic amine, an N,N-dialkyl aniline, piperidine, piperazine, morpholine, hexamethylene imine and thiomorpholine.

6. A process as claimed in claim 5 wherein said alkaline agent is a member selected from the group consisting of sodium carbonate, potassium carbonate, sodium hydrogen carbonate, sodium acetate, potassium hydrogen carbonate, pyridine, piperidine, quinoline, morpholine and tributylamine.

7. A process as claimed in claim 1 wherein said reduction is carried out in an inert organic solvent selected from the group consisting of ethylene glycol, diethylene glycol, diethylene glycol monomethyl ether and monoethyl ether, N-methylpyrrolidone, N,N-dimethylformamide, o-dichlorobenzene, trichlorobenzene, nitrobenzene, naphthalene, the methylnaphthalenes and mixtures thereof.

8. A process as claimed in claim 7 wherein the heated reaction mixture consists of said dinitrodihydroxyanthraquinone, said reductant in an amount of ½ to 5 times the weight of said dinitrodihydroxyanthraquinone, and said solvent.

9. A process as claimed in claim 1 wherein said substituted phenol is selected from the group consisting of o-cresol, m-cresol, p-cresol, xylenol, o-aminophenol, m-aminophenol, p-aminophenol, p-tert.-butylphenol and mixtures thereof.

10. A process for the production of 1-amino-5-nitro-4,8-dihydroxyanthraquinone by partial reduction which comprises heating 1,5-dinitro-4,8-dihydroxyanthraquinone in the presence of a reductant selected from the group consisting of unsubstituted phenol, pyrogallol, resorcinol, hydroquinone, hydroquinone monomethyl ether, substituted phenol having on the phenyl nucleus besides the phenolic -OH one or more substituents selected from the group consisting of alkyl having 1-4 carbon atoms, alkoxy having 1-4 carbon atoms, halogen and amino, and mixtures thereof at from 80° to 250° C until only one nitro group is reduced to the amino group, and the 1-amino-5-nitro-4,8-dihydroxyanthraquinone is then separated.

11. A process as claimed in claim 10 wherein the reduction is carried out at a temperature of from 100° to 180° C.

12. A process as claimed in claim 10 wherein the reduction is carried out in an excess of said reductant as the reaction medium.

13. A process as claimed in claim 10 wherein the amount of said reductant is from half to five times the weight of the dinitrodihydroxyanthraquinone.

14. A process as claimed in claim 10 wherein the reduction is carried out in the presence of 0.5 to 20 mol percent of an alkaline agent selected from the group consisting of an alkali metal hydroxide, an alkaline earth metal hydroxide, an alkali metal carbonate, an alkali metal hydrogen carbonate, an alkali metal acetate, an alkali metal phenolate, an alkaline earth metal phenolate, pyridine, a picoline, quinaldine, quinoline, a secondary or tertiary aliphatic or cycloaliphatic amine, an N,N-dialkyl aniline, piperidine, piperazine, morpholine, hexamethylene imine and thiomorpholine.

15. A process as claimed in claim 14 wherein said alkaline agent is a member selected from the group consisting of sodium carbonate, potassium carbonate, sodium hydrogen carbonate, sodium acetate, potassium hydrogen carbonate, pyridine, piperidine, quinoline, morpholine and tributylamine.

16. A process as claimed in claim 10 wherein said reduction is carried out in an inert organic solvent selected from the group consisting of ethylene glycol, diethylene glycol, diethylene glycol monomethyl ether and monoethyl ether, N-methylpyrrolidone, N,N-dimethylformamide, o-dichlorobenzene, trichlorobenzene, nitrobenzene, naphthalene, the methylnaphthalenes and mixtures thereof.

17. A process as claimed in claim 10 wherein said substituted phenol is selected from the group consisting of o-cresol, m-cresol, p-cresol, xylenol, o-aminophenol, m-aminophenol, p-aminophenol, p-tert.-butylphenol and mixtures thereof.

* * * * *